July 25, 1950 S. L. CHRISTIE 2,516,184
COOLING SYSTEM
Filed July 2, 1948
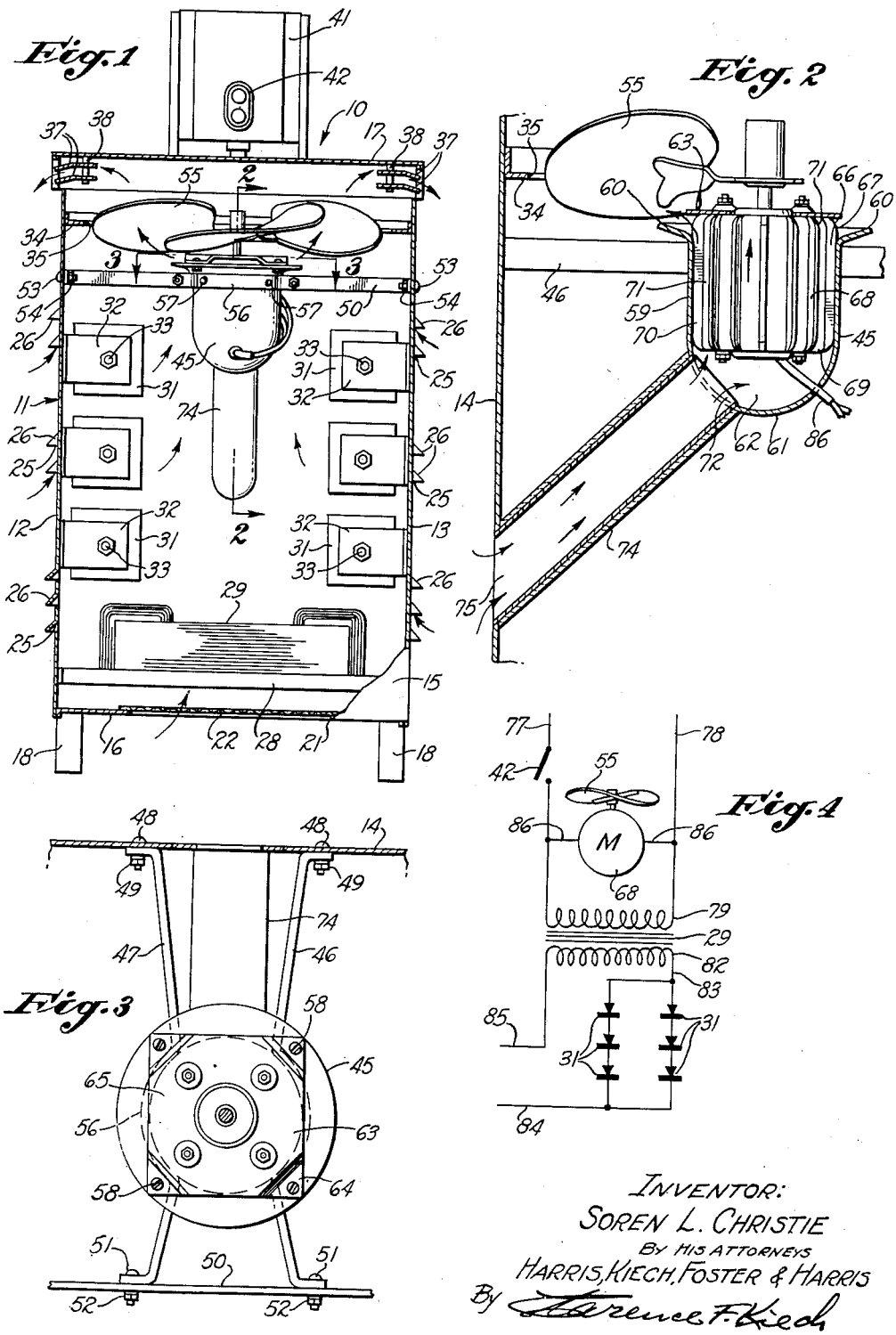
INVENTOR:
SOREN L. CHRISTIE
BY HIS ATTORNEYS
HARRIS, KIECH, FOSTER & HARRIS
By Clarence F. Kiech Patented July 25, 1950

2,516,184

UNITED STATES PATENT OFFICE 2,516,184

COOLING SYSTEM

Soren L. Christie, Los Angeles, Calif.

Application July 2, 1948, Serial No. 36,660

2 Claims. (Cl. 175—298)

This invention relates to improvements in cooling systems for motors and more particularly to a system for cooling a motor which is disposed in a flow of fluid whose properties are inimical to the proper functioning and/or cooling of the motor.

Although my invention is described and shown as utilized in conjunction with a rectifying apparatus, it is not intended that it be limited specifically thereto since it is conceivable that the principles of my invention can be readily applied to a wide variety of constructions and devices.

For instance, I have discovered that, even when the motor is disposed in normal ambient air, my invention can be advantageously utilized since the cooperation of the various elements of the system permits a larger volume of cooling air to be drawn over the motor at higher velocities. Thus, the motor may be more effectively cooled by my system than by conventional auxiliary fans disposed within the motor housing or a cylindrical shield surrounding the motor.

It is a conventional practice to arrange a bank of dry type rectifiers within a cabinet and to provide some means for passing cooling air or fluid over the rectifiers in order to carry away the heat radiated by the rectifiers in the process of rectifying an alternating current passing to the rectifying apparatus.

Since one of the most common methods of drawing cooling air over the rectifier stack is the utilization of a fan-driving motor which will serve to induce an air flow over the stacks and through the cabinet in which the stacks are mounted and since it is frequently more efficient to place the fan at the exhaust end of the cabinet and to draw the heated air out of the cabinet, it is desirable to dispose the motor and its associated fan in the flow of the air which has been heated by contact with the rectifier stacks. Due to the fact that the air flowing past the motor from the rectifier stacks is frequently so hot that only an insufficient cooling effect can be imparted to the motor itself, it happens that motors incorporated in such cooling systems wear out prematurely due to the ineffectiveness of the heated cooling air flow from the rectifier stack which causes the lubricating material in the bearings to dry out.

It is, therefore, a primary object of my invention to provide a fan-driving motor which is adapted to be incorporated within a cabinet which constitutes an air flow passage and which is adapted to draw the air flow therethrough past the motor which has associated therewith a shield completely surrounding the major portion of the motor, which is adapted to be provided with a separate flow of cooling fluid, and which is also adapted to prevent the impingement upon the motor of the heated flow of air from the rectifier stacks.

The utilization of supplementary fans mounted within the motor housing and adapted to draw air thereinto has been ineffective since the air drawn into the housing had been heated to a point where its cooling action was not sufficient to keep the motor in good running condition.

Another object of my invention is the provision of a cooling system for a motor suspended in a flow of heated fluid and which drives a fan adapted to induce the flow of said heated fluid through a passage constituted by the walls of a rectifier cabinet, in the present embodiment. The system includes a shield surrounding and spaced from the peripheral area of the motor housing which is designed to have induced to flow therethrough, by the action of the fan which also serves to induce the main cooling air flow for the rectifier stacks, a separate flow of cooling air. Therefore, the utilization of auxiliary fan means which serve only to draw over the motor previously heated cooling air is avoided.

Since the primary function of the motor driven fan is to draw cooling air over the rectifier stacks, it is necessary that the cooling of the motor associated therewith will not in any way hinder the effective cooling of the rectifier stacks.

Another object of my invention is the provision of a cooling system for a motor placed in the path of the flow of hot fluid, said flow being induced by a fan driven by the motor, which includes a shield adapted to be disposed about the peripheral area of the motor and to be spaced therefrom which has conducted thereto a separate flow of cooling fluid drawn over the motor through the medium of the fan which draws the main flow over the objects to be cooled. The shield is so constructed that it is adapted to divide the effective fan area into a first larger area which is adapted to induce the main flow of cooling air and a second smaller area which is adapted to induce the second flow of cooling air through the shield and over the motor housing.

Another object of my invention is the provision of a cooling system for a motor driven fan which is essentially simple in construction, which is readily adaptable to already existing types and styles of rectifier cabinets and motors, and which can be embodied therein without materially increasing the cost of such units.

Due to the ineffective cooling expedients utilized in prior art cooling systems, the failure of motors incorporated for cooling purposes in devices of the type described has been rather frequent and the expense incident to such failure has been a considerable factor in the maintenance cost of such devices. In addition, since such devices are utilized in places of entertainment and for similar purposes, the failure thereof frequently results in considerable inconvenience and expense.

Another object of my invention is to materially reduce the maintenance costs of motors incorporated in prior art devices by providing a cooling system constructed in accordance with my invention.

Other objects and advantages of my invention will be made apparent from the following specification and the accompanying drawing, which is for the purpose of illustration, and in which:

Fig. 1 is a vertical sectional view of a rectifier cabinet incorporating a motor cooling system constructed in accordance with my invention;

Fig. 2 is a detailed, enlarged, sectional view taken on line 2—2 of Fig. 1;

Fig. 3 is a partly plan, partly sectional view taken on line 3—3 of Fig. 1; and

Fig. 4 is a schematic illustration of the circuit embodied in a rectifier unit incorporating the cooling system which is the subject matter of my invention.

Referring to the drawing, I show a rectifying apparatus 10 which includes a cabinet 11 having side walls 12 and 13, a back wall 14, a front wall 15, a bottom portion or plate 16 and a top portion or deck 17. The cabinet 11 is supported upon legs 18 which may be affixed thereto in any desired manner, as by screws or similar fasteners.

The bottom plate or portion 16 is provided with a centrally located air intake opening 21 through which cooling air is adapted to be drawn and which is covered by a screen 22 designed to prevent the entry of foreign bodies carried in the cooling air. A plurality of air inlet openings 25 are formed in the side walls 12 and 13 and are provided with outstruck integral louvers 26 which are adapted to prevent the entry of moisture, dust or similar foreign bodies. Mounted within the cabinet 11 and supported therein through the medium of a transverse support 28 is a transformer 29 which is adapted to be cooled by an influx of cooling air through the opening 21 formed in the bottom plate 16.

Mounted upon the side walls 12 and 13 in spaced relationship to each other and arranged adjacent the air inlet openings 25 is a plurality of metallic disc type rectifiers 31 in the form of rectifier stacks which are suspended upon brackets 32 through the medium of bolts and nuts 33, or similar fasteners, and which are adapted to be cooled by ambient air drawn into the passage constituted by the cabinet 11 through the medium of the adjacent inlet openings 25.

Disposed within the top portion 17 of the cabinet 11 is a generally rectangular baffle plate 34 which has formed therein a circular exhaust opening 35 through which exhausted cooling air is adapted to flow to atmosphere through the intermediary of a plurality of laterally directed baffles 37 which are supported by the top portion 17 of the cabinet by means of spacer elements 38. Projecting above and secured to the top portion 17 of the cabinet 11 is a switch housing 41 which is adapted to protect a stop-start switch 42 which controls the activation and deactivation of the rectifying apparatus 10.

Centrally located within the cooling air passage defined by the walls of the cabinet 11 is a metallic shield 45 which is supported therein through the medium of hangers 46 and 47 which are supported at one end upon the back wall 14 of the cabinet 11 by means of bolts 48 and nuts 49, or any other similar fasteners, and which are supported at their other end upon a transverse strap or hanger 50 by the medium of bolts 51 and nuts 52. The ends of the strap or hanger 50 are supported by bolts 53 and nuts 54 upon the side walls 12 and 13 of the cabinet 11. As best shown in Figs. 1 and 3, the hangers 46 and 47 are provided with intermediate, arcuate outstruck portions 56 which are adapted to encircle the periphery of the shield 45 and which are disposed in such a manner as to support the shield 45 centrally of the cabinet 11. The shield is fixedly attached to the arcuate, intermediate portions 56 of the hangers 46 and 47 by means of rivets 57, or any similar desired fastener. As is most clearly shown in Fig. 2 of the drawing, the shield 45 is of generally cup-shaped configuration and includes a vertical side wall 59 terminating in an annular flange 60 and in a concave bottom portion 61 which constitutes a plenum chamber 62 for a purpose which will be described in greater detail below.

Secured to the upper side of the annular flange 60 of the shield 45 by means of screws 58 is a rectangular mounting plate 63, preferably formed of copper or similar material of light thermal conductivity, and which has offset, downstruck corners 64 through which the screws 58 pass, and through the medium of which the main portion 65 is raised above the upper surface of the annular flange 60. There is thus defined by the juxtaposition of the mounting plate 63 to the annular flange 60 a passage 66 which is substantially circumferential, contiguous to a discharge opening 67 of the shield 45 and through which air passing from the plenum chamber 62 in a manner to be described in greater detail below is adapted to be exhausted.

Disposed within the shield 45 and adapted to drive a fan 55 is an electric motor 68 which is provided with a housing 69 having a plurality of integral, radially directed fins 70 which are adapted to facilitate the dissipation through the housing 69 of heat generated by the motor 68.

The major portion of the housing 69 is spaced from the interior of the vertical wall of the shield 45 but the peripheral edges of the fins 70 are disposed within the interior of the vertical wall 59 and constitute, in cooperation with the interior of the vertical wall 59, upwardly directed passages 71 which are adapted to permit the air or cooling fluid directed past the housing 69 to be exhausted to atmosphere through the generally circumferential passage 66 contiguous to the discharge opening 67 of the shield 45.

Although the shield 45 has been described as formed of metal, it is, of course, conceivable that it may be formed of any suitable material and it is not intended to limit the construction to the particular materials utilized. Located in the bottom wall 61 of the shield 45 is an intake opening 72 which is adapted to communicate with the plenum chamber 62; through the medium of the air or fluid intake opening 72 is an air or fluid intake conduit 74 which has its other end in communication with a hole or secondary air intake opening 75 formed in the rear wall 14 of the cabinet 11.

As illustrated in Fig. 4, conductors 77 and 78 connect a primary winding 79 of the transformer 29 to a source, not shown, of alternating current to be rectified, the stop-start switch 42 being associated with the conductor 77 for opening and closing the circuit. One end of the secondary winding 82 of the transformer 29 is connected by a conductor 83 to the two banks of rectifiers 31 arranged in parallel and to a conductor 84 which, with a conductor 85 connected to the other end of the secondary winding 82, provides the direct current circuit. The fan motor 68 is connected by conductors 86 to the alternating current circuit provided by the conductors 77 and 78. Although the rectifiers 31 are shown as being arranged in parallel, it is, of course, conceivable that they might be arranged in series, or in series-parallel or in bridge connection as the needs of the particular application of the rectifier apparatus necessitate.

When the alternating current is to be rectified, the fan motor 68 is energized by the activation of the stop-start switch 42, rotating the fan 55 and exhausting air from the passage constituted by the walls of the cabinet 11 and expelling the exhausted air through the baffles 37 in the top portion 17 of the cabinet to atmosphere, thus creating a partial vacuum within the cabinet and drawing air thereinto. Air is drawn into the cabinet through the opening 21 in the bottom plate 16 and through the screen 22, as indicated by the arrows in Fig. 1. This air passes upwardly around the transformer 29 and mingles with air drawn into the cabinet through the air inlet openings 25 which passes over the rectifiers 31. As can readily be imagined, when the air has passed over the transformer 29 and the rectifier 31 the temperature thereof is materially increased and the utilization of this heated air to cool the motor 68, as has been customary in the past, has resulted in the premature break-down of motors so ineffectively cooled.

In the present embodiment of my invention the air drawn in through the opening 21 in the bottom plate 16 and through the inlet openings 25 in the walls 12 and 13 of the cabinet 11, constitutes a first fluid flow which is adapted to be channeled by the passage defined by the walls of the cabinet 11.

The fan motor 68 is cooled by a second flow of cooling air which is induced to flow by the action of the fan 55 through the opening 75 in the rear wall 14 of the cabinet 11, then through the cooling air conduit 74 and into the plenum chamber 62 of the shield 45 surrounding the motor 68. Upon its entry into the plenum chamber 62, the air is equally distributed around the base of the motor housing 69 and the exhaust effect of the fan 55 causes the air to rise through the vertical passages 71 and then out of the discharge opening 67 adjacent the circumferential passage 66 between the mounting plate 63 and the annular flange 60 of the shield 45. The air which flows through the conduit 74 and into the plenum chamber 62 of the shield 45 forms the second fluid flow which is isolated from the first fluid flow through the passage defined by the cabinet 11 by the conduit 74.

As indicated above, the circular opening 35 in the baffle plate 34 constitutes an exhaust opening within which the fan 55 is adapted to be located. The shield 45 is also disposed adjacent the exhaust opening 35 and is adapted, through the intermediary of the laterally projecting annular flange 60, to divide the low pressure area existing in this region and caused by the rotation of the fan 55 into a first, larger low pressure area which is adapted to cause the exhausting through the opening 35 of the first fluid flow of heated air which results from the passage of cooling air over the transformer 29 and the rectifier stacks 31 and a second, smaller low pressure area which is adapted to cause the second fluid flow or flow of cooling air to pass over the motor 68 in the interior of the shield 45 and to be exhausted through the discharge opening 67 of the shield 45. In addition to dividing the low pressure area established by the operation of the fan 55 in the region of the exhaust opening 35 in the baffle 34, the shield also serves, through the intermediary of the laterally projecting annular flange 60 to divide the path of rotation of the fan blade in order that a sufficient area of the fan may be devoted to securing a low pressure effect to induce the flow of the second cooling air stream over the electric motor 68.

I thus provide by my invention a cooling system for an electric motor which is suspended in a first fluid flow within a passage which has associated therewith a shield and conduit means adapted to permit the passage therethrough of a second fluid flow adapted to more effectively cool the motor 68 than has been possible in the past. Also provided by my invention is a cooling system which dispenses with the need for any auxiliary fan because it utilized the main cooling fan to provide a second low pressure area in the exhaust opening which is sufficient to cause the flow of the second cooling airstream over the electric motor. Due to the utilization of the cooling system which is the subject of my invention, the cooling of the rectifier stacks and the transformer is materially improved because the electric motor is able to operate at full power under even the most extreme conditions and the maintenance costs of keeping the electric motor in proper running repair is materially reduced.

Although I have described and illustrated a preferred embodiment of my invention, it is obvious that changes and alterations may be made in the details thereof and in component elements and parts and I, therefore, do not intend to be limited to the specific conception shown or to particular elements or parts but rather intend that my invention be accorded the full scope of the following claims.

I claim as my invention:

1. A rectifier apparatus including in combination: a cabinet having two side walls and two end walls forming an upright passage, said side walls providing top portions; an imperforate deck of a size to cover said upright passage; means for mounting said imperforate deck in a position spaced above said top portions of said side walls to provide outwardly-facing air-discharge spaces below said deck; a baffle plate extending transversely of said upright passage a short distance below said deck and dividing said passage into exhaust and intake spaces respectively above and below said baffle plate, said baffle plate providing an exhaust opening forming substantially the sole communication between said exhaust and intake spaces; a rotary fan in said exhaust opening for moving a large stream of air upwardly through said exhaust opening to move outwardly in said exhaust space and to discharge outwardly through said air-discharge spaces below said deck; a motor for driving said fan; means for mounting said motor in said intake space; a bottom plate extending between said side and end walls to bound the lower end of said intake space, said bottom plate having an air inlet opening; a transformer means; means for mounting said transformer means in said intake space near said bottom plate but above said opening, said fan drawing a stream of transformer-cooling air upwardly through such opening into contact with said transformer means to be deflected thereby before rising to said fan; a plurality of stacks of rectifiers; bracket means for mounting said stacks of rectifiers on at least one of said side walls to extend in said intake space and leave an upwardly-extending passage leading to said fan and through which the stream of transformer-cooling air moves to said fan, said motor being in said upwardly-extending passage; louvers on said side walls and providing air inlet openings respectively contiguous to said stacks and respectively conducting streams of rectifier-cooling air into cooling relationship with said rectifier stacks, said streams of rectifier-cooling air being drawn by said fan from the exterior of said cabinet through said louver-formed air inlet openings in an inward and upward direction to rise to said fan through said upwardly-extending passage; and means for electrically connecting said motor and rectifier stacks to said transformer means.

2. A rectifier apparatus as defined in claim 1, including a cup-shaped shield around said motor and cooperating with the periphery thereof in defining upwardly-extending passage means longitudinally traversing the periphery of the motor for conducting air from the lower interior of said shield along said motor, said passage means providing an upper portion opening on a zone below a portion of said fan, and an air intake conduit opening at one end on said lower interior of said shield and extending through said upwardly-extending passage to one of said end walls to open on the atmosphere outside such end wall, whereby said fan circulates a separate motor-cooling stream of air from the atmosphere through said air intake conduit and upwardly around the periphery of said motor through said passage means.

SOREN L. CHRISTIE.

REFERENCES CITED

The following references are of record in the file of this patent:

UNITED STATES PATENTS

| Number | Name | Date |
|---|---|---|
| 1,537,228 | Gargan | May 12, 1925 |
| 1,668,537 | Lurken | May 1, 1928 |
| 1,858,581 | Coppus | May 17, 1932 |
| 2,022,644 | Ashcraft | Dec. 3, 1935 |
| 2,171,643 | Brenkert | Sept. 5, 1939 |
| 2,189,909 | Korber | Feb. 13, 1940 |
| 2,279,620 | Hirschman | Apr. 14, 1942 |

FOREIGN PATENTS

| Number | Country | Date |
|---|---|---|
| 229,708 | Great Britain | Mar. 26, 1925 |
| 377,132 | Germany | June 9, 1923 |